Jan. 6, 1970 HISAO MAEDA 3,488,642

MAGNETIC THIN FILM MEMORY DEVICE UTILIZING
A COMMON NOISE BALANCING LINE

Filed March 23, 1966 2 Sheets-Sheet 1

INVENTOR
HISAO MAEDA
BY

H. Edward Masters

INVENTOR
HISAO MAEDA
BY
H. Edward Mostern

United States Patent Office 3,488,642
Patented Jan. 6, 1970

3,488,642

MAGNETIC THIN FILM MEMORY DEVICE UTILIZING A COMMON NOISE BALANCING LINE

Hisao Maeda, Ota-ku, Tokyo-to, Japan, assignor to Toko Kabushiki Kaisha, Ota-ku, Tokyo-to, Japan, a joint-stock company of Japan Filed Mar. 23, 1966, Ser. No. 536,678
Claims priority, application Japan, May 21, 1965, 40/29,918
Int. Cl. G11c *11/14*
U.S. Cl. 340—174 4 Claims

ABSTRACT OF THE DISCLOSURE

A memory device of the matrix form has a large number of digit lines crossing word lines; the digit lines are grouped into groups, and each group includes a plurality of digit lines. A common noise balancing line is combined with each group in parallel with the digit lines thereof and the ends of all the digit lines of each group on one side thereof are commonly grounded together with the end of the respective noise balancing line on said side and the other ends of the digit lines and the noise balancing line of said group are provided with respective output means.

This invention relates to memory devices of matrix form and more particularly to memory devices of matrix form in each of which magnetic thin film wire (hereinafter referred to as "magnetic wire") consisting of thin conductor wire covered by a thin ferromagnetic film constitute digit lines, and a large number of these digit lines in substantially parallel arrangement are crossed by numerous word lines consisting of lengths of ordinary insulated conductor wire.

In a memory device of the above stated character, when a word current is passed through a word line, a part of the word current flows via the stray capacitance between the word line and the digit lines into the digit lines to become a cause of noise.

Expedients adapted to overcome this difficulty have been considered, as described more fully hereinafter, but these have entailed disadvantages such as increase in size and manufacturing cost.

It is an object of the present invention to overcome the above described difficulty and the above stated disadvantages.

According to the present invention, briefly stated, there is provided a memory device of the matrix type referred to above, characterised in that the digit lines are divided into groups of a plurality of digit lines each, a common noise balancing line being combined with each of the groups, and the ends of all digit lines of each group on one side are connected commonly and grounded (earthed) together with the end of the respective noise balancing line on that side, while the ends of the digit lines and the noise balancing line of the group on the other side are provided with respective output means for leading out their respective outputs.

The nature, principle, and details of the invention will be more clearly apparent from the following detailed description, when read in conjunction with the accompanying drawings, in which like parts are designated by like reference characters.

Figure 1:
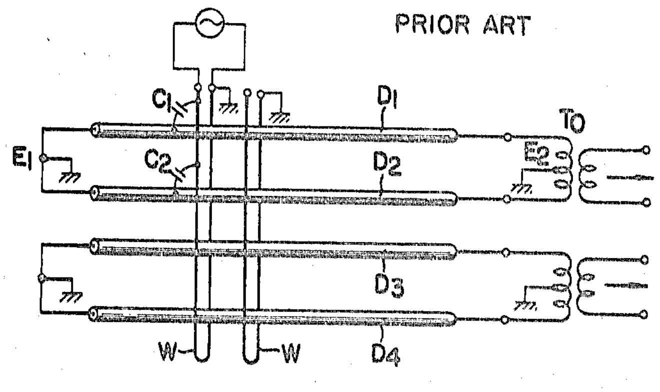
FIG. 1 is an enlarged schematic diagram showing one part of a memory device of known type.

One method which has been considered for preventing the aforementioned noise due to stray capacitance in a memory device of matrix form of the type referred to hereinbefore is to connect two of the magnetic wires $D_1$ and $D_2$ (digit lines) in series as shown in FIG. 1, ground (earth) the midpoint of their junction $E_1$, and ground also the midpoint $E_2$ of the primary winding of an output transformer $T_0$ connected to the output ends of these digit lines $D_1$ and $D_2$.

In the arrangement shown in FIG. 1, one of the lengths of each word line W is also grounded. This may be considered to be equivalent to the state wherein either one of the forward line (outgoing line) and return line of the word line is grounded with a specific impedance since, in general, the forward and return lines of a word line do not balance fully with respect to the ground (earth).

By the above described connection arrangement, the word currents flowing into the digit lines through the stray capacitances $C_1$ and $C_2$ produced between each word line W and magnetic wires $D_1$ and $D_2$ are approximately equal and, since their directions are mutually opposite, nullify each other, whereby noise is not produced at the output terminals.

However, when the magnetic wires are used in connected pairs in this manner, although noise is reduced, the required number of magnetic wires is doubled, giving rise to the disadvantages of increased size of the entire device and increased manufacturing cost.

These disadvantages have been eliminated by the present invention, which will now be described with respect to preferred embodiments thereof with reference to FIGS. 2 and 3.

Figure 2:
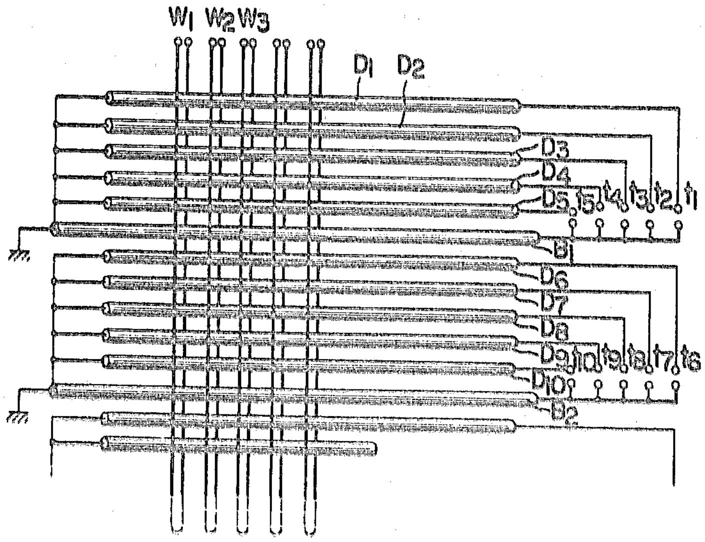
FIGS. 2 and 3 are schematic diagrams showing examples of preferred embodiment of the invention.
Figure 3:
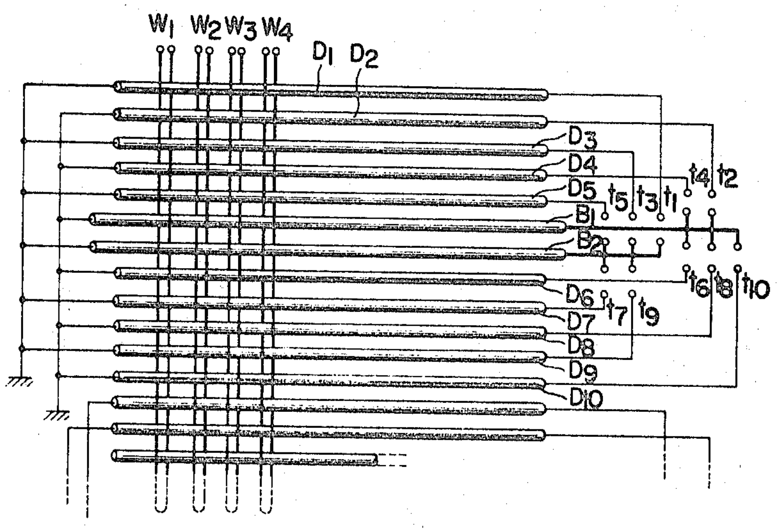

The memory device shown in FIG. 2 is an example of application of the present invention to a memory device of the type wherein digit lines $D_1$, $D_2$, $D_3$ . . . are surrounded by word lines $W_1$, $W_2$, $W_3$ . . ., while the memory device shown in FIG. 3 is an example of application of the invention to a memory device of woven type formed by weaving a group of digit lines and a group of word lines into a fabric structure. In either case, the digit lines are grouped into groups of 5 lines each, and the groups are assembled with respective noise balancing lines $B_1$, $B_2$ . . ., each of which is common to the digit lines of its respective group. The digit lines are provided respectively with output terminals $t_1$, $t_2$, $t_3$ . . . .

The noise balancing lines $B_1$, $B_2$ . . . are preferably of the same diameter as the digit lines. This is for the purpose of causing the stray capacitances between the word lines and digit lines and the stray capacitances between the noise balancing line and the word lines to be equal, as much as possible, thereby to ensure further elimination of noise.

In the woven type memory device shown in FIG. 3, two noise balancing lines $B_1$ and $B_2$ are interwoven adjacently and combined respectively with even number digit lines and odd number digit lines. This arrangement is also, for the purpose of balancing the stray capacitances as much as possible thereby to achieve complete elimination of noise.

Figure 4:
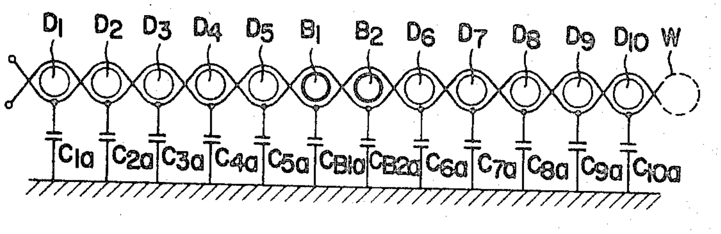
FIG. 4 is an enlarged, schematic end view of the memory device shown in FIG. 3.

In the case of a woven type memory device, a single word line W weaves alternately around the front and reverse sides of the digit lines as indicated in FIG. 4, and, therefore, the electrostatic capacitances between the word line W and ground (earth) are of different values for the odd number and even number digit lines.

More specifically, when the capacitances between the word line and the ground at the positions of the digit lines as shown in FIG. 4 are respectively denoted by $C_{1a}$, $C_{2a}$ . . ., and those at the positions of the noise balancing lines $B_1$ and $B_2$ are denoted by $C_{B1a}$, $C_{B2a}$ . . ., the following relationships are obtained.

$$C_{1a}=C_{3a}=C_{5a} \ldots =C_{Ba2}$$
$$C_{2a}=C_{4a}=C_{6a} \ldots =C_{B1a}$$

Since the capacitances between the word line and ground differ with the odd and even numbers of the digit lines, the capacitances $C_1$, $C_2$, $C_3$ . . . between the word line and the digit lines and the capacitances $C_{B1}$, $C_{B2}$, $C_{B3}$ . . . between the word line and the noise balancing lines $B_1$, $B_2$, $B_3$ . . . also differ with the odd and even numbers of the digit lines. However, by grouping only the digit lines of odd numbers of the same condition and those of the even numbers and separating these groups as indicated in FIG. 3, it is possible to elminate noise almost completely.

While wire of a non-magnetic material is preferably used for the noise balancing lines, the same magnetic wire as that for the digit lines may be used in some cases.

I wish it to be understood that I do not desire to be limited to the exact details of construction shown and described, for obvious modifications will occur to a person skilled in the art.

What I claim is:

1. In a magnetic memory device of the matrix type wherein a large number of magnetic thin film wires constituting digit lines are disposed to cross a large number of word lines and balancing lines for cancelling noise are used, the combination wherein the digit lines are grouped into groups each group including a plurality of digit lines, a common noise balancing line is combined with each of said groups in parallel with the digit lines thereof, and the ends of all digit lines of each group on one side thereof are commonly grounded together with the end of the respective noise balancing line on said side and the other ends of the digit lines and the noise balancing line of said group are provided with respective output means for leading out their respective outputs.

2. The arrangement as claimed in claim 1, wherein the digit lines in each group are disposed in successively adjacent arrangement.

3. The arrangement as claimed in claim 1, wherein the digit lines of one of said groups are alternately interposed between the digit lines of another of said groups.

4. The arrangement as claimed in claim 1, wherein the noise balancing line and the digit lines of each group are of substantially the same diameter.

References Cited

UNITED STATES PATENTS

| | | | |
|---|---|---|---|
| 3,137,843 | 6/1964 | Gaunt | 340—174 |
| 3,144,641 | 8/1964 | Raffel | 340—174 |
| 3,319,233 | 5/1967 | Amemiya et al. | 340—174 |
| 3,325,791 | 6/1967 | Italia | 340—174 |
| 3,325,793 | 6/1967 | Simkins et al. | 340—174 |

TERRELL W. FEARS, Primary Examiner

KENNETH E. KROSIN, Assistant Examiner